United States Patent
Yamaguchi et al.

(10) Patent No.: US 9,669,688 B2
(45) Date of Patent: Jun. 6, 2017

(54) TAILGATE-EQUIPPED VEHICLE BODY STRUCTURE

(71) Applicant: Honda Motor Co., Ltd., Tokyo (JP)

(72) Inventors: Tomoki Yamaguchi, Wako (JP); Seiji Honda, Wako (JP); Yusuke Fujita, Wako (JP); Takuya Hoshi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/919,968

(22) Filed: Oct. 22, 2015

(65) Prior Publication Data

US 2016/0114662 A1  Apr. 28, 2016

(30) Foreign Application Priority Data

Oct. 23, 2014  (JP) ................................ 2014-216556

(51) Int. Cl.
*B60J 5/10* (2006.01)

(52) U.S. Cl.
CPC .............. *B60J 5/103* (2013.01); *B60J 5/101* (2013.01); *B60J 5/105* (2013.01); *B60J 5/107* (2013.01)

(58) Field of Classification Search
CPC ....................................................... B60J 5/101
USPC ............................ 296/50, 51, 56, 146.8, 106
See application file for complete search history.

(56) References Cited

U.S. PATENT DOCUMENTS

| 4,413,854 A * | 11/1983 | Hirshberg ................ B60J 5/101 296/146.8 |
| 8,814,228 B2 | 8/2014 | Fujiwara et al. |
| 2015/0183307 A1 | 7/2015 | Hakamada |

FOREIGN PATENT DOCUMENTS

| DE | 20 2006 013385 U1 | 1/2008 |
| DE | 10 2008 018 333 A1 | 10/2009 |
| JP | 1-150119 U | 10/1989 |
| JP | H03-115549 U | 11/1991 |
| JP | 5-35425 U | 5/1993 |
| JP | 2006-290023 A | 10/2006 |
| JP | 2009-227237 A | 10/2009 |
| JP | 2010-966 A | 1/2010 |
| JP | 2014-12445 A | 1/2014 |

OTHER PUBLICATIONS

Extended (Supplemental) European Search Report dated Mar. 30, 2016, issued in counterpart European Patent Application No. 15191248.2. (6 pages).
Office Action dated Sep. 2, 2016, issued in counterpart Japanese Patent Application No. 2014-216556, with partial English translation. (9 pages).

* cited by examiner

*Primary Examiner* — Dennis H Pedder
(74) *Attorney, Agent, or Firm* — Westerman, Hattori, Daniels & Adrian, LLP

(57) ABSTRACT

A tailgate-equipped vehicle body structure includes a tailgate for opening and closing a rear opening section provided in a rear section of a vehicle, and a sub door provided on the tailgate for opening and closing a sub door opening section provided in the tailgate. The upper surface of a lower edge portion of the rear opening section and the upper surface of a lower edge portion of the sub door opening section are located in substantially flush with each other.

8 Claims, 15 Drawing Sheets

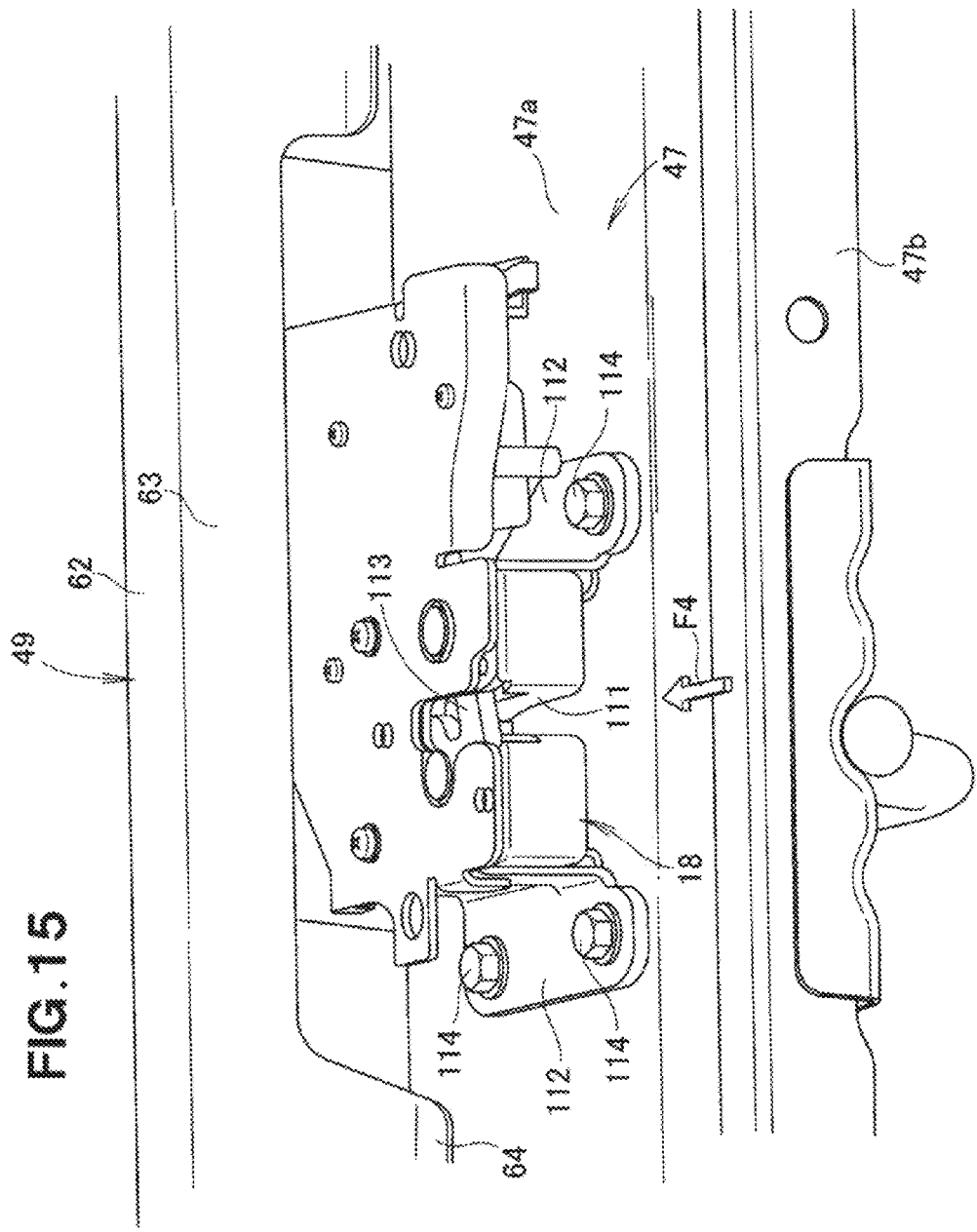

TAILGATE-EQUIPPED VEHICLE BODY STRUCTURE

TECHNICAL FIELD

The present invention relates to vehicle body structures which include a tailgate for opening and closing a rear opening section of a vehicle, a sub door opening section formed in the tailgate and a sub door provided on the tailgate for opening and closing the sub door opening section.

BACKGROUND

Among the conventionally-known tailgate-equipped vehicle body structures is one disclosed, for example, in Japanese Patent Application Laid-open Publication No. 2014-12445 (hereinafter referred to as "the relevant patent literature"), in which the tailgate for opening and closing a rear opening section is provided on a rear section of the vehicle and a sub door is provided on the tailgate so that a sub door opening section formed in the tailgate is opened and closed by the sub door. When the tailgate is in the closed position, the sub door opening is located rearward of the rear opening section. With the tailgate kept in the closed position, a passenger can get in and out the vehicle, through the sub door opening section and the rear opening section, by opening the sub door opening section with the sub door.

With the tailgate-equipped vehicle body structure disclosed in the relevant patent literature, where the rear opening section is provided in the rear section of the vehicle and the sub door opening section is formed in the tailgate, a level difference would be formed between a lower edge portion of the sub door opening section and a lower edge portion of the rear opening section. Such a level difference between the lower edges portions of the sub door opening section and the rear opening section may undesirably prevent passengers from smoothly getting in and out of the vehicle and prevent baggage from being smoothly loaded and unloaded to and from the vehicle.

SUMMARY

In view of the foregoing prior art problems, it is an object of the present invention to provide an improved tailgate-equipped vehicle body structure which, with the sub door kept in the opened position, allows passengers to smoothly get in and out of the vehicle and allows baggage to be smoothly loaded and unloaded to and from the vehicle.

In order to accomplish the above-mentioned object, the present invention provides an improved tailgate-equipped vehicle body structure, which comprises: a tailgate for opening and closing a rear opening section provided in a rear section of a vehicle; and a sub door provided on the tailgate for opening and closing a sub door opening section provided in the tailgate, the upper surface of a lower edge portion of the rear opening section and the upper surface of a lower edge portion of the sub door opening section being located in substantially flush with each other.

According to the present invention, the upper surface of the lower edge portion of the rear opening section and the upper surface of the lower edge portion of the sub door opening section are located in substantially flush with each other. Hereinafter, the lower edge portion of the rear opening section will be referred to as "rear lower edge portion", and the lower edge portion of the sub door opening section will be referred to as "door's lower edge portion".

Namely, the upper surface of the rear lower edge portion and the upper surface of the door's lower edge portion are located substantially flush with each other. Thus, when the sub door is in an open position to open the sub door opening section, baggage can be loaded and unloaded smoothly through the sub door opening section, and in particular, passengers can get in and out of the vehicle through the sub door opening section smoothly without getting caught by a level difference between the rear lower edge portion and the door's lower edge portion. Further, when the tailgate is in an open position to open the rear opening section, the upper surface of the rear lower edge portion is kept at a suitable height position, and thus, baggage having been loaded into the interior of the vehicle (vehicle interior) through the sub door opening section can be retained appropriately in the vehicle interior by the rear lower edge portion of the rear opening section. Thus, the rear lower edge portion can prevent the baggage, having been loaded in the vehicle interior, from undesirably getting out to outside the vehicle (vehicle exterior) as the tailgate is opened.

Preferably, in the tailgate-equipped vehicle body structure of the invention, the tailgate includes an inner panel disposed adjacent to the vehicle interior and an outer panel disposed adjacent to the vehicle exterior and having a closed sectional shape defined with respective flanges of the inner and outer panels joined to each other, the respective flanges of the inner and outer panels joined to each other constituting a joined flange part projecting in a vertical or up-down direction of the vehicle in the lower edge portion of the sub door opening section. The tailgate further includes a gate-side step covering the joined flange part from above, and the upper surface of an upper wall portion of the gate-side step constituting the upper surface of the lower edge portion of the sub door opening section. Because the joined flange part extends in the up-down direction of the vehicle, there is no need for the upper joined flange part to extend in the vehicle front-rear direction, and thus, it is possible to minimize a thickness dimension, i.e. dimension in the vehicle front-rear direction, of the tailgate. Further, the joined flange part projecting in the up-down direction is covered from above with the gate-side step, and the upper surface of the upper wall portion of the gate-side step constitutes the upper surface of the lower edge portion Thus, when a downward load has been applied to the upper surface of the door's rear lower edge portion by baggage being placed on the upper surface of the door's rear lower edge portion or a passenger stepping on the upper surface of the door's rear lower edge portion, the downward load can be efficiently borne by the joined flange part that extends in the same vertical direction as the applied downward load.

Preferably, the gate-side step includes a rib projecting downward from the upper wall portion of the gate-side step and extending in a thickness direction of the tailgate, and the rib has a recessed portion formed to receive therein the joined flange part. Because the rib extends or projects downward from the upper wall portion of the gate-side step, a downward load applied to the upper surface of the upper wall portion of the gate-side step (i.e., the upper surface of the door's lower edge portion) can be borne more efficiently by the rib. Here, it is conceivable that, when a passenger gets in or out of the vehicle or baggage is loaded or unloaded, the door's lower edge portion is displaced in the vehicle front-rear direction by a leg of the passenger or the baggage hitting the door's lower edge portion. Thus, in the present invention, the rib has the recessed portion for receiving therein the joined flange part, so that unwanted displacement, in the vehicle front-rear direction, of the gate-side step can be prevented by the recessed portion being abutted against the joined flange part.

Preferably, the tailgate-equipped vehicle body structure of the present invention further comprises a molding member extending along the joined flange part of the tailgate and mounted at opposite end portions thereof to the joined flange part. The gate-side step includes a middle step portion constituting a part of the lower edge portion of the sub door opening section, corner portions provided at the opposite ends of the middle step portion, and the opposite end portions of the molding member are covered with respective ones of the corner portions. Thus, the end portion of the molding member can be prevented from being exposed to the outside, so that an enhanced outer appearance of the vehicle can be achieved. Further, the end portions of the molding member are located in the corner portions, so that the molding member need not be mounted to the door's lower edge portion. In this way, it is possible to lower the position of the door's lower edge portion by an amount corresponding to a thickness dimension of the molding member. Thus, a height of the door's lower edge portion can be lowered without being influenced by the molding member, so that the upper surface of the door's lower edge portion can be readily located in substantially flush with the upper surface of the rear lower edge portion.

Preferably, the rear opening section includes a closed-sectional portion formed of a metal panel in a closed sectional shape, and at least a part of a lower portion of the tailgate being located above the upper surface of the closed-sectional portion. The tailgate-equipped vehicle body structure of the present invention further comprises a vehicle-body-side step disposed above the closed-sectional portion, and the upper surface of the vehicle-body-side step constitutes the upper surface of the lower edge portion of the rear opening section. Deep-drawing of the metal panel would be necessary if the upper surface of the closed-sectional portion formed of a metal panel is designed to extend upward all the way to the upper surface of the rear lower edge portion, and thus, shape-forming of the closed-sectional portion tends to be difficult. Therefore, in the present invention, the vehicle-body-side step is mounted above the closed-sectional portion in such a manner that the upper surface of the vehicle-body-side step constitutes the upper surface of the rear lower edge portion. In this manner, the need for forming the upper surface of the rear lower edge portion with the upper surface of the closed-sectional portion can be eliminated, and, thus, it is possible to lower a height of the upper surface of the closed-sectional portion. Thus, the need for deep-drawing the metal panel can be eliminated, so that formability of the closed-sectional portion can be enhanced.

Further, preferably, the tailgate-equipped vehicle body structure of the present invention further comprises a bracket provided, as a separate member, on the upper surface of the closed-sectional portion, and the bracket is located within the vehicle-body-side step and opposed to the front surface of the lower portion of the tailgate. The vehicle-body-side step projects upward from the closed-sectional portion, in order to form the upper surface of the rear lower edge portion with the upper surface of the vehicle-body-side step. Thus, with the tailgate in the open position, the vehicle-body-side step would be exposed toward the rear of the vehicle. Consequently, it is conceivable that, when a passenger gets in or out of the vehicle or baggage is loaded or unloaded, a leg of the passenger or the baggage hits the vehicle-body-side step in a front-to-rear or rear-to-front direction of the vehicle. Therefore, in the present invention, the bracket provided on the upper surface of the closed-sectional portion is located within the vehicle-body-side step. Thus, the vehicle-body-side step can be sufficiently supported by the bracket and maintained in a stabilized state.

Further, preferably, the tailgate-equipped vehicle body structure of the present invention further comprises a support rib projecting from the upper wall portion of the vehicle-body-side step toward the upper surface of the bracket. Thus, when a downward load has been applied to the upper surface of the rear lower edge portion by baggage being placed on the upper surface of the rear lower edge portion or a passenger stepping on the upper surface of the rear lower edge portion, the downward load can be reliably borne by the bracket via the support rib.

Preferably, the tailgate-equipped vehicle body structure of the present invention further comprises an engaging claw provided on a front wall portion of the vehicle-body-side step for engaging the bracket, and a mounting portion for mounting to the upper surface of the closed-sectional portion is provided on a rear portion of the vehicle-body-side step. Because the mounting portion on the rear portion of the vehicle-body-side step is mounted on the upper surface of the closed-sectional portion, there is no need for mounting the mounting portion on the bracket, and thus, there is no need for the bracket to extend to the mounting portion. As a consequence, it is possible to minimize a width dimension, in the vehicle front-rear direction, of the bracket. Further, the support rib extends from the upper surface of the upper wall portion of the vehicle-body-side step toward the upper surface of the bracket; namely, no such support rib is provided on a front wall portion and rear portion of the vehicle-body-side step. Thus, the engaging claw and the mounting portion are provided while avoiding the support rib. Thus, it is not necessary to consider interference between the support rib and the engaging claw and between the support rib and the mounting portion, so that it is possible to enhance a degree of freedom in determining a shape of the vehicle-body-side step (step garnish).

Further, preferably, a storing recessed section for storing a seat of the vehicle in a folded configuration is provided forward, in the vehicle front-rear direction, of the rear lower edge portion, and the upper surface of the seat stored in the storing recessed section is located in substantially flush with the upper surface of the rear lower edge portion and the upper surface of the door's lower edge portion. Thus, substantially flush surfaces are formed successively by the upper surface of the seat, the upper surface of the rear lower edge portion and the upper surface of the door's lower edge portion. By the provision of such substantially flush surfaces (i.e., successive flat surfaces), baggage can be loaded and unloaded smoothly through the sub door opening section when the sub door opening is in the open position; in particular, passengers can get in and out of the vehicle through the sub door opening section smoothly without getting caught by the level difference. Further, when the tailgate is in the open position, a rear end portion of the seat is covered with the rear lower edge portion. Thus, it is possible to prevent a passenger or baggage from hitting the rear end portion of the seat when the passenger gets in or out of the vehicle or baggage is loaded or unloaded to or from the vehicle.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will hereinafter be described in detail, by way of example only, with reference to the accompanying drawings, in which:

FIG. 15 is a view taken in the direction of arrow 15 in FIG. 12.

DETAILED DESCRIPTION

Now, embodiments of a tailgate-equipped vehicle body structure 10 of the present invention will be described. In the following description, the terms "front", rear, "left" and "right, etc. are used to refer to directions as viewed from a human driver of the vehicle. Also, hereinafter, the tailgate-equipped vehicle body structure 10 will also be referred to simply as "vehicle body structure 10".

Figure 1:
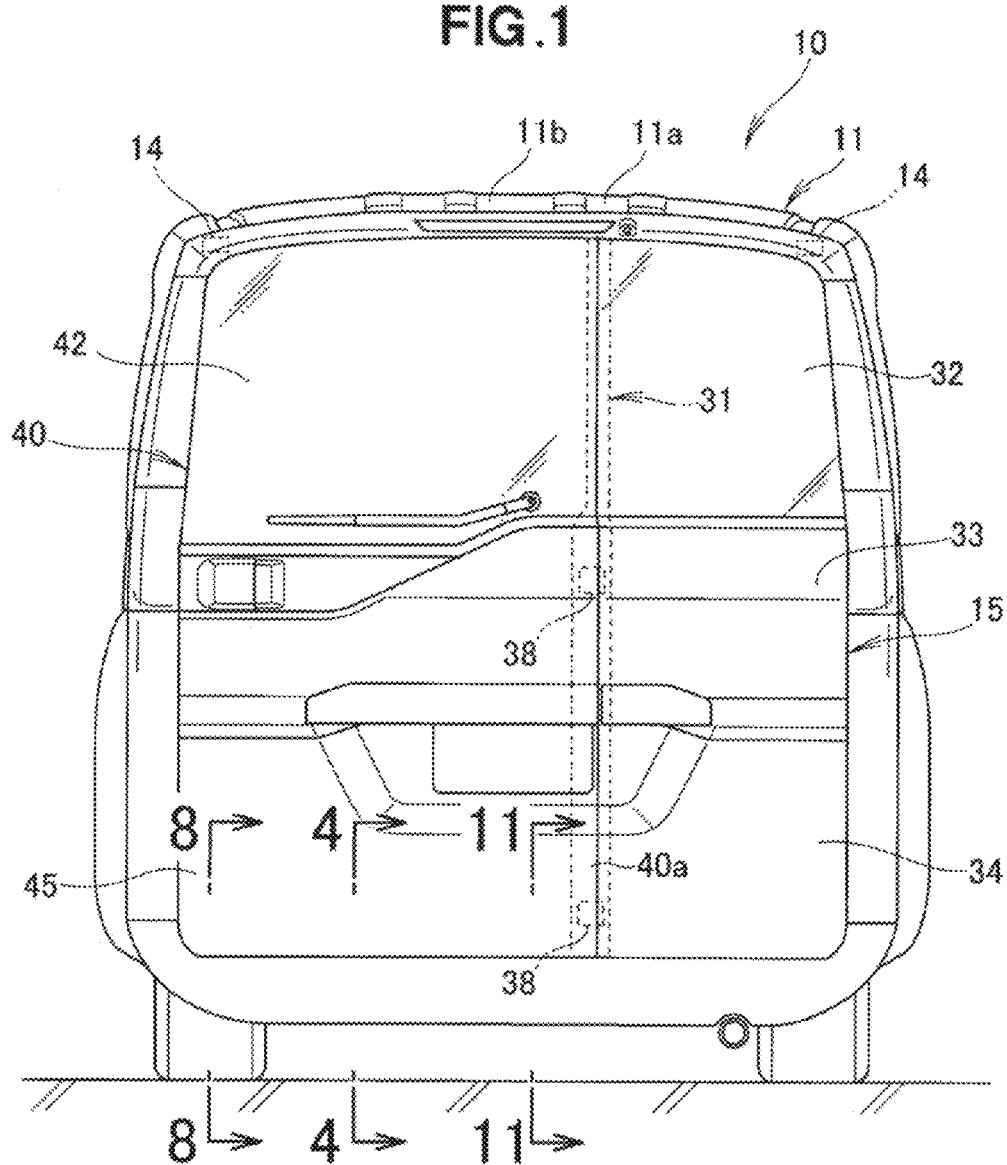
FIG. 1 is a back view of an embodiment of a tailgate-equipped vehicle body structure of the present invention as viewed from the rear of the vehicle.
Figure 2:
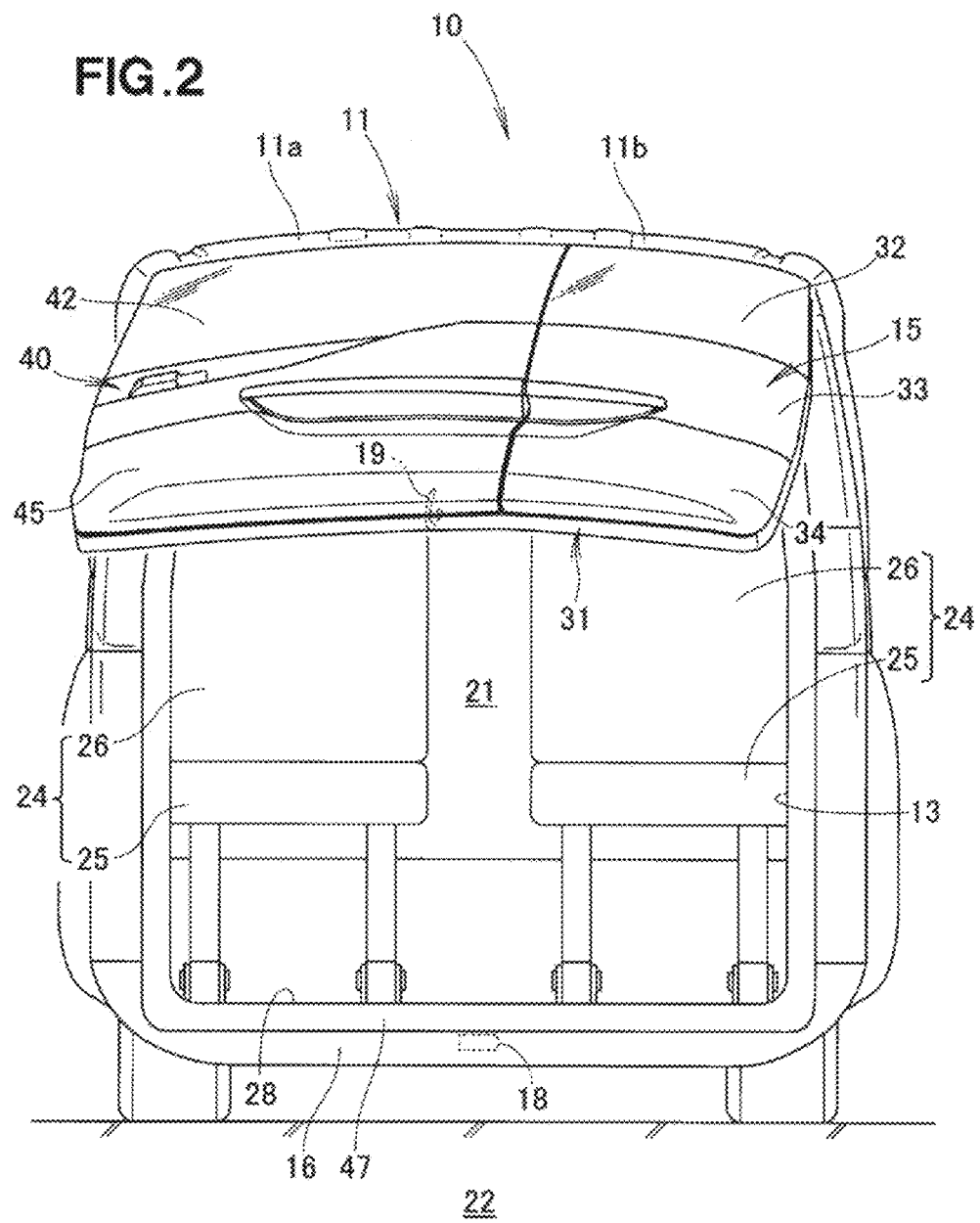
FIG. 2 a back view showing the tailgate-equipped vehicle body structure when the tailgate is in an open position.

As shown in FIGS. 1 and 2, the vehicle body structure 10 according to an embodiment of the present invention includes: a rear opening section 13 provided in a rear section 11a of a vehicle 11; a plurality of gate support shafts 14 provided on the rear section 11a of the vehicle 11; and a tailgate 15 pivotably supported on the plurality of gate support shafts 14 for opening and closing the rear opening section 13.

The vehicle body structure 10 further include: a latch device 18 provided on the rear section 11a of the vehicle 11; seats 24 provided in the interior 21 of the vehicle 11 (i.e., vehicle interior 21); and a storing recessed section 28 (FIG. 4) provided rearward of the seat 24.

As the tailgate 15 is closed, a striker of the tailgate 15 is engaged by the latch device 18 so that the tailgate 15 is locked in a closed position.

The tailgate 15 includes: a gate body 31 supported on an upper portion 11b of the rear section 11a of the vehicle 11 via the plurality of gate support shafts 14 in such a manner that it is pivotable in a vertical or up-down direction about the shafts 14; a gate window glass 32 mounted on the gate body 31; an upper outer gate surface member 33 provided beneath the gate window glass 32; and a lower gate surface member 34 provided beneath the upper outer gate surface member 33. The gate body 31 is a member constituting a part of the rear section 11a of the vehicle 11. The upper outer gate surface member 33 and the lower gate surface member 34 are resin-made members constituting a part of the outer surface of the tailgate 15.

Figure 3:
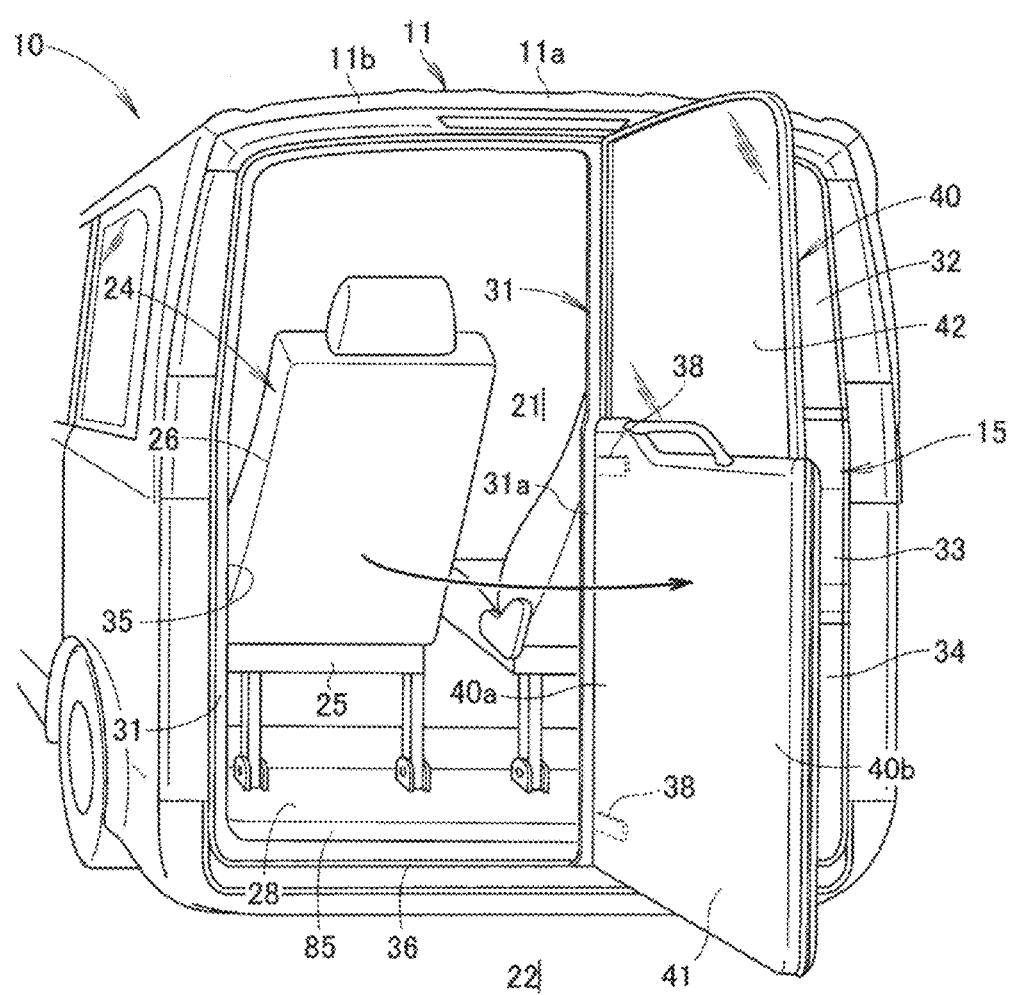
FIG. 3 is a back view showing the tailgate-equipped vehicle body structure when a sub door is in an open position.

As shown in FIG. 3, the tailgate 15 further has a sub door opening section 35 formed in the gate body 31 to the left of the gate window glass 32, upper outer gate surface member 33 and lower gate surface member 34.

In addition, the tailgate 15 includes: upper and lower door hinges 38 provided on a right side edge portion 31a of the sub door opening section 35; a sub door 40 having its right edge portion 40a connected to the upper and lower door hinges 38; and the striker 19 (see FIG. 2) provided on the gate body 31. With the tailgate 15 in the closed position, the sub door opening section 35 is kept in communication with the rear opening section 13.

Further, as shown in FIG. 2, the rear opening section 13 is opened by the tailgate 15 being pivoted upward into a substantially horizontal posture. By the rear opening section 13 being opened like this, the vehicle interior 21 and the vehicle exterior 22 are brought into communication with each other, so that passengers can get in and out of the vehicle and baggage can be loaded and unloaded to and from the vehicle through the rear opening section 13.

On the other hand, the tailgate 15 is placed in a substantially vertical posture by being pivoted downward. In this state, the rear opening section 13 is closed with the tailgate 15, and the striker 19 of the tailgate 15 is engaged by the latch device 18.

Referring back to FIG. 3, the sub door 40 includes a door body 41 pivotably supported on the right side edge portion 31a of the gate body 31 via the upper and lower door hinges 38, and a door window glass 42 provided on an upper end portion of the door body 41. Namely, the sub door 40 is pivotably supported at its right side edge portion 40a on the right side edge portion 31a of the gate body 31 via the upper and lower door hinges 38. Thus, the sub door 40 is pivotally openable in a horizontal direction (indicated by a black arrow) by a left side edge portion 40b being operated away from the gate body 31 to the outside 22 (vehicle exterior 22). Thus, the sub door opening section 35 can be opened and closed by the sub door 40 being pivoted horizontally about the upper and lower door hinges 38.

Figure 4:
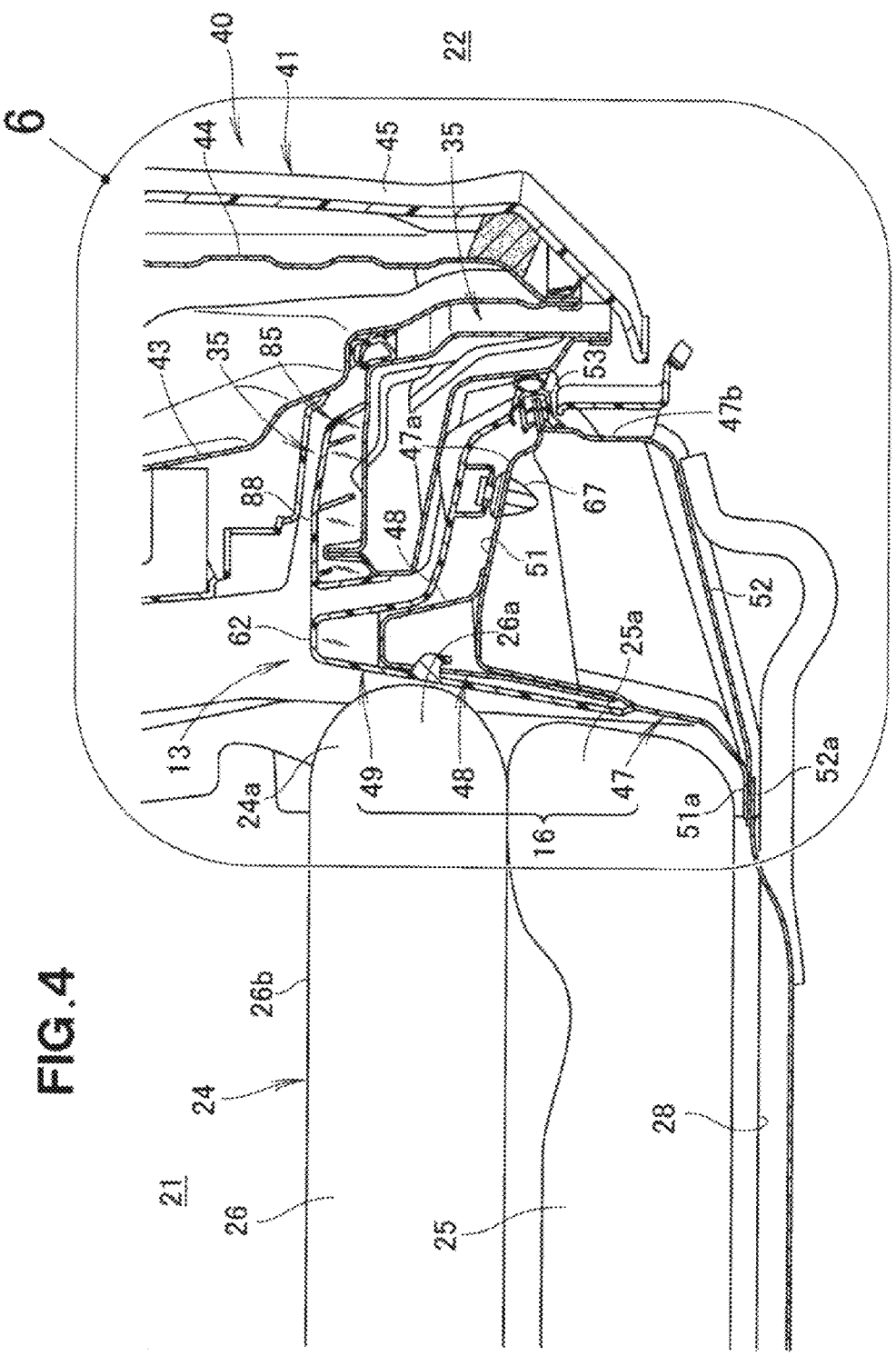
FIG. 4 is a sectional view taken along line 4-4 of FIG. 1.
Figure 5:
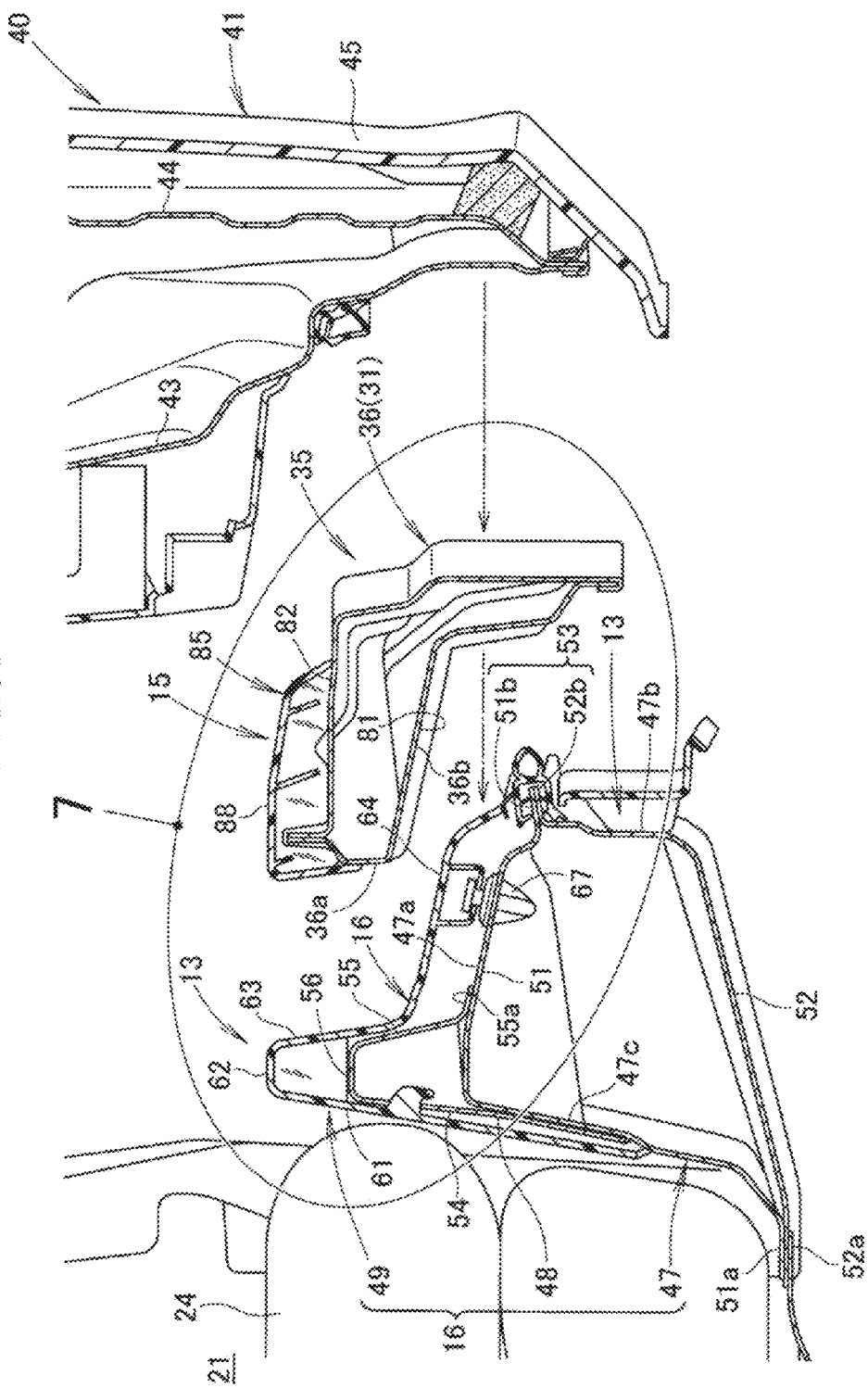
FIG. 5 is an exploded sectional view showing the tailgate-equipped vehicle body structure with the tailgate and the sub door detached therefrom.

Further, as shown in FIGS. 4 and 5, the door body 41 includes: a metal-made inner door panel 43 provided adjacent to the vehicle interior 21; a metal-made outer door panel 44 provided closer to the vehicle exterior 22 than the inner door panel 43; and a resin-made outer door surface member 45 provided closer to the vehicle exterior 22 than a lower half portion of the outer door panel 44.

The rear opening section 13 includes: a rear lower frame (closed sectional member) 47 formed of a metal panel in a closed sectional shape; a bracket 48 provided on an upper wall portion 47a of the rear lower frame 47; and a vehicle-body-side step (step garnish) 49 provided above and over the bracket 48 and the rear lower frame 47. The rear lower frame 47, the bracket 48 and the step garnish 49 together constitute a lower edge portion 16 of the rear opening section 13 ("hereinafter referred to as "rear lower edge portion 16").

The rear lower frame 47 includes a rear inner panel ("inner panel") 51 and a rear outer panel ("outer panel") 52. The rear inner pane; 51 and the rear outer panel 52 have their front respective flanges 51a and 52a fixedly joined to each other and have their rear respective flanges 51b and 52b fixedly joined to each other. With the rear inner pane 51 and the rear outer panel 52, the rear lower frame 47 is formed in a closed sectional shape. Hereinafter, the jointed rear respective flanges 51b and 52b will be referred to collectively as "rear joined flange part 53".

Figure 6:
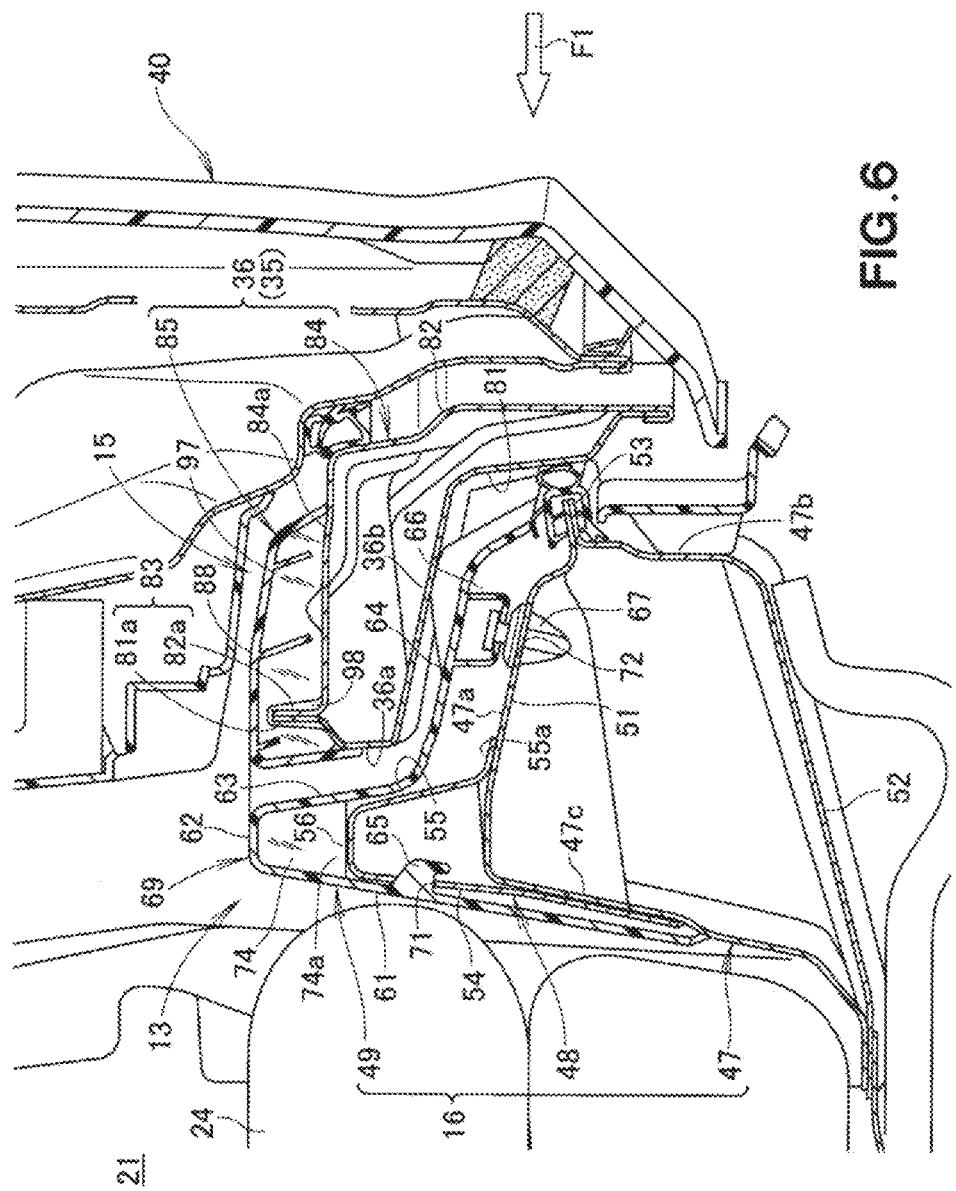
FIG. 6 is an enlarged fragmentary view of a section surrounded at 6 in FIG. 4.

Further, as shown in FIGS. 5 and 6, the rear lower frame 47 has its rear end portion 47b located forward, in a front-rear direction of the vehicle (vehicle front-rear direction), of the tailgate 15 and overlapping the tailgate 15 as viewed from the rear of the vehicle. The rear joined flange part 53 is provided on the rear end portion 47b of the rear lower frame 47 and projects from the rear end portion 47b toward the rear of the vehicle. Thus, a forward impact loaf F1 input from the rear of the vehicle can be efficiently borne by the rear joined flange part 53, so that it is possible to restrain the rear lower frame 47 from being deformed by the forward impact loaf F1.

The bracket 48, formed as a member separate from the rear lower frame 47, is provided on the upper wall portion 47a of the rear lower frame 47. The bracket 48 has: a front wall portion 54 joined to the front surface 47c of the rear lower frame 47; a rear wall portion (or bracket's rear surface) 55 having a lower end portion 55a joined to the upper wall portion 47a of the rear lower frame 47; and an upper wall portion 56 interconnecting the front wall portion 54 and the rear wall portion 55.

The bracket 48 projects upward from a front upper surface region of the upper wall portion 47a of the rear lower frame 47 and is located within the vehicle-body-side step 49, and the bracket's rear surface 55 is opposed to the front surface of a lower portion of the tailgate 15.

A lower edge portion 36 of the sub door opening section 35 (hereinafter referred to as "door's lower edge portion 36") is formed by the lower portion of the tailgate 15. The front surface of the lower portion of the tailgate 15 constitutes the front surface 36a of the door's lower edge portion 36. Namely, the bracket's rear surface 55 is opposed to the front surface 36a of the door's lower edge portion 36.

Further, the vehicle-body-side step 49 projects upward from the upper surface of the upper wall portion 47a of the rear lower frame 47. Thus, when the tailgate 15 is in the open position, the vehicle-body-side step 49 is exposed to the rear of the vehicle. Thus, it is conceivable that, when a passenger gets in or out of the vehicle or baggage is loaded or unloaded, a leg of the passenger or the baggage hits the vehicle-body-side step 49 in a front-to-rear or rear-to-front direction of the vehicle.

Therefore, in the instant embodiment, the bracket 48 formed of high-rigid metal is provided on the upper wall portion 47a of the rear lower frame 47 and located within the vehicle-body-side step 49. Thus, even when a leg of the passenger and baggage has hit the vehicle-body-side step 49, the vehicle-body-side step 49 can be sufficiently supported by the bracket 48 and maintained in a stabilized state.

The vehicle-body-side step 49, which is mounted above the rear lower frame 47, is a resin-made garnish having a front wall portion 61, a front upper wall portion 62, a rear wall portion 63 and a rear upper portion 64. When the tailgate 15 is in the closed position, at least a part 36b of the door's lower edge portion 36 (i.e., lower portion of the tailgate 15) is located above and over the rear upper wall portion 64 of the vehicle-body-side step 49 and the upper wall portion 47a of the rear lower frame 47.

Further, the front wall portion 61, front upper wall portion 62 and rear wall portion 63 of the vehicle-body-side step 49 together constitute a protruding portion 69. The bracket's upper wall portion 56 is located within the protruding portion 69, and the front upper wall portion 62 is located above and over the upper wall portion (i.e., the upper surface of the upper wall portion, or bracket's upper surface) 56. The front upper wall portion 62 constitutes the upper surface of the rear lower edge portion 16.

The rear inner panel 51 and the rear outer panel 52 of the rear lower frame 47 are each formed of a metal panel. Thus, it is necessary to deep-draw the rear inner panel 51 if the rear inner panel 51 is designed to extend upward all the way to the front upper wall portion 62, and thus, shape-forming of the rear inner panel 51 tends to be difficult.

Thus, in the instant embodiment, the vehicle-body-side step 49 is mounted above the rear lower frame 47 in such a manner that the upper surface of the front upper wall portion 62 constitutes the upper surface of the rear lower edge portion 16. In this manner, the need for forming the upper surface of the rear lower edge portion 16 with the rear inner panel 51 can be eliminated, and, thus, it is possible to reduce a necessary amount of deep-drawing of the rear inner panel 51. In this way, formability of the rear inner panel 51 (and hence the rear lower frame 47) can be significantly enhanced.

Further, an engaging claw 65 is provided on the front wall portion 61 of the vehicle-body-side step 49, and a clip (mounting portion) 67 is provided on the rear upper wall portion 64 via a seat portion 66. The engaging claw 65 is engaged or locked in a locking hole 71 formed in the bracket's front wall portion 54, and the clip 67 is engaged in a mounting hole 72 formed in the upper wall portion 47a of the rear lower frame 47. In this manner, the vehicle-body-side step 49 is mounted to the rear lower frame 47 and the bracket 48.

Because the clip 67 on the rear upper wall portion 64 is engaged in the mounting hole 72 formed in the upper wall portion 47a of the rear lower frame 47, there is no need for mounting the clip 67 on the bracket 48, and thus, there is no need for the bracket 48 to extend rearward all the way to the position of the clip 67. As a consequence, it is possible to minimize a width dimension, in the vehicle front-rear direction, of the bracket 48 and thus minimize the weight of the bracket 48.

Figure 7:
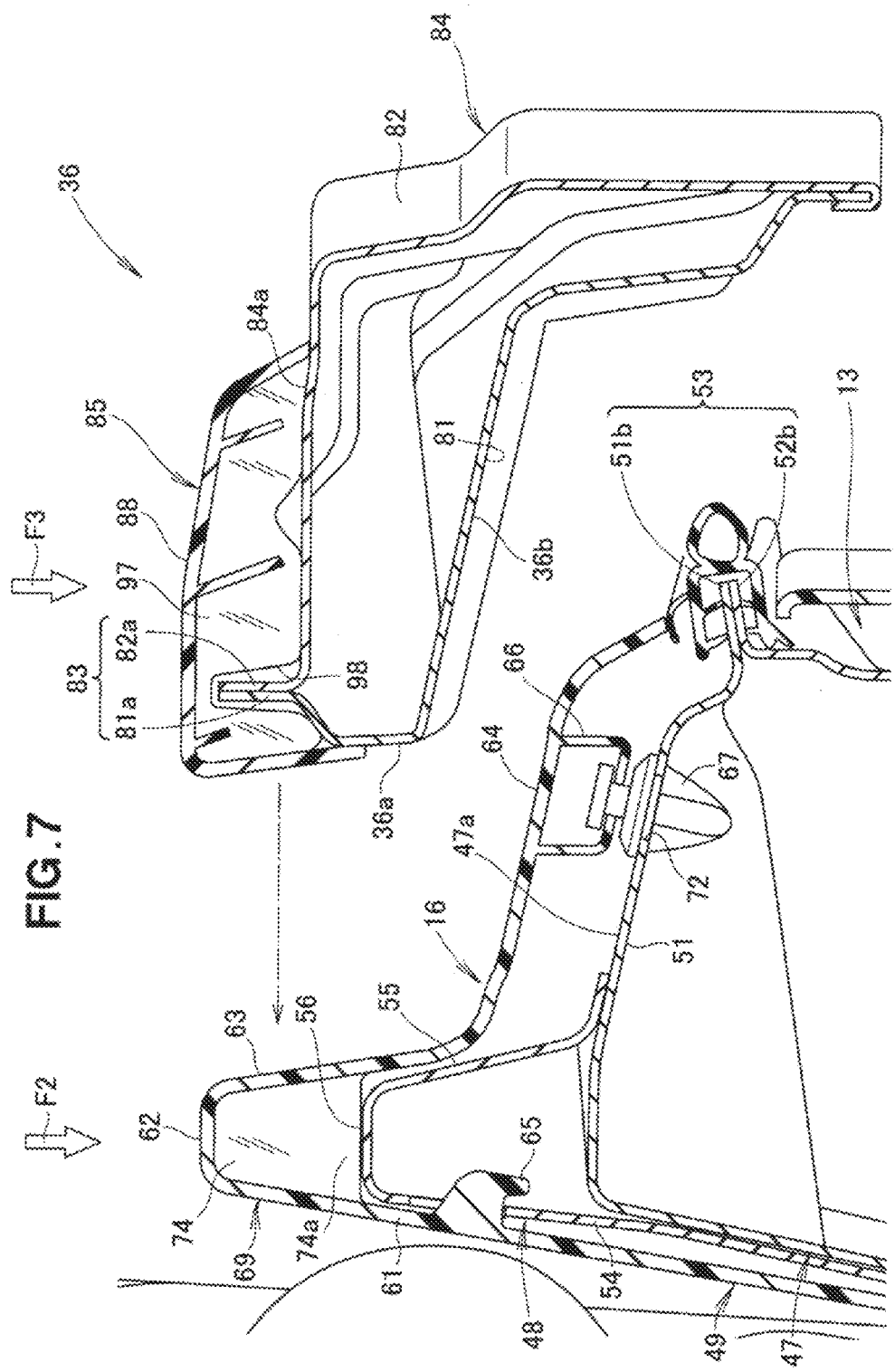
FIG. 7 is an enlarged fragmentary view of a section encircled at 7 in FIG. 5.

Further, as shown in FIG. 7, a plurality of support ribs 74 are formed on the front upper wall portion 62 and spaced from one another in a vehicle width direction and protrude downward from the lower surface of the front upper wall portion 62 to the upper surface of the upper wall portion 56 (or bracket's upper surface 56). The support ribs 74 have their respective lower end portions 74a placed on the bracket's upper surface 56. Thus, when a downward load F2 has been applied to the front upper wall portion 62 (i.e., upper surface of the rear lower edge portion 16) by baggage being placed on the upper surface of the front upper wall portion 62 or a passenger stepping on the upper surface of the front upper wall portion 62, the downward load F2 can be reliably borne by the bracket 48 via the individual support ribs 74.

The plurality of support ribs 74 are provided between the front upper wall portion 62 and the bracket's upper surface 56. Namely, no such support rib 74 is provided on the front wall portion 61 and rear upper wall portion 64. Thus, the engaging claw 65 and the clip 67 are provided on the front wall portion 61 and rear upper wall portion 64, respectively, while avoiding the support ribs 74. Thus, it is not necessary to consider interference between the support ribs 74 and the engaging claw 65 and between the support ribs 74 and the clip 67, so that it is possible to enhance a degree of freedom in determining a shape of the vehicle-body-side step 49.

Figure 8:
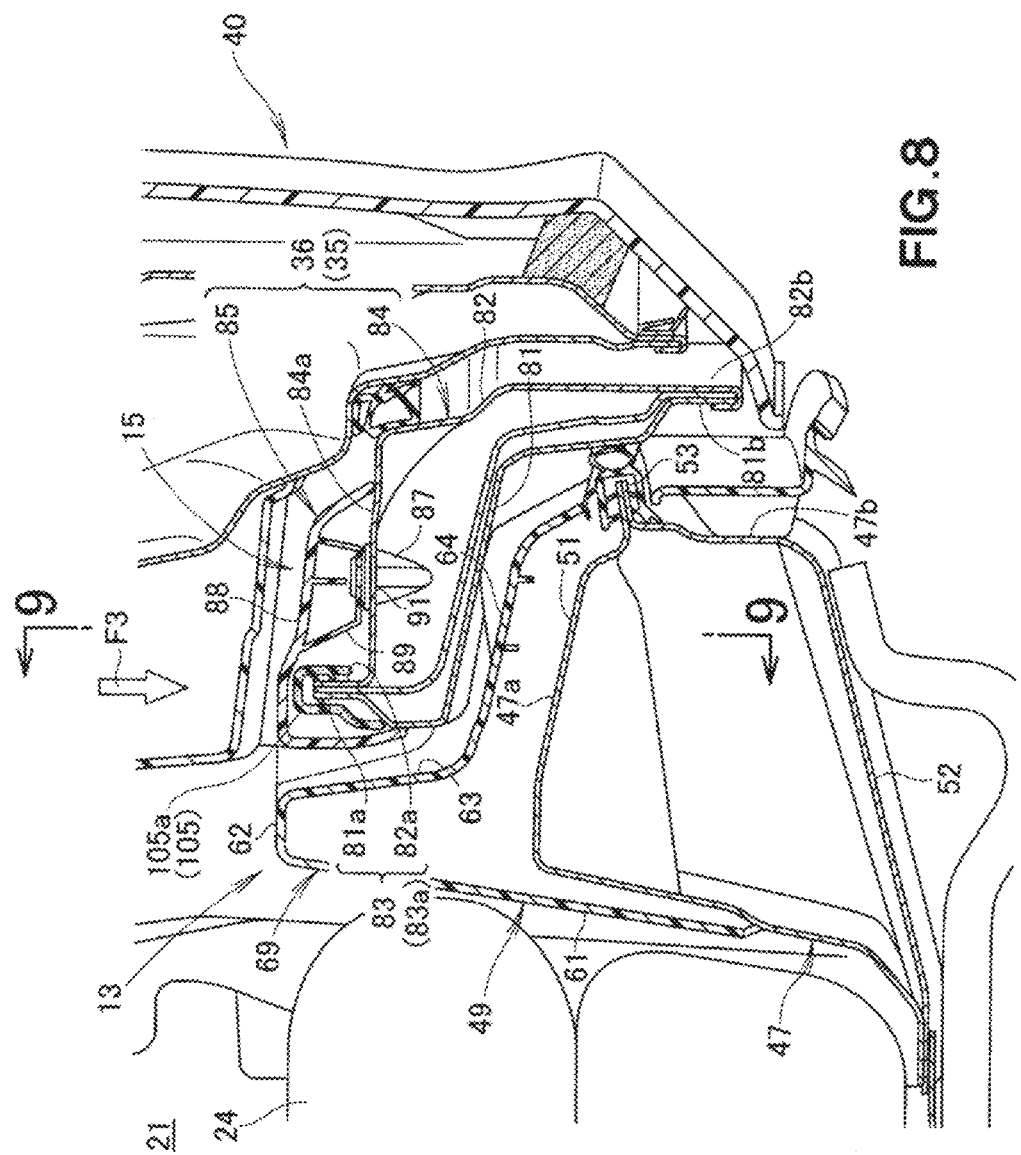
FIG. 8 is a sectional view taken along line 8-8 of FIG. 1.

Further, as shown in FIGS. 6 and 8, the rear opening section 13 is opened and closed with the tailgate 15, and the tailgate 15 has the sub door opening section 35 that has the door's lower edge portion 36. The door's lower edge portion 36 includes a lower gate frame 84 formed of a metal panel in a closed sectional shape, and a gate-side step 85 provided on the upper surface 84a of the lower gate frame 84.

The lower gate frame 84 includes an inner panel 81 provided adjacent to the vehicle interior 21, and an outer door panel 82 provided adjacent to the vehicle exterior 22. The inner panel 81 and the outer door panel 82 have their respective upper flanges 81a and 82a fixedly joined with each other and have their respective lower flanges 81b and 82b fixedly joined with each other. Thus, with the inner pane 81 and the rear outer panel 82, the lower gate frame 84 is formed in a closed sectional shape. Hereinafter, the joined upper flanges 81a and 82a will be referred to collectively as "upper joined flange part 83".

In the door's lower edge portion 36 of the sub door opening section 35, the upper joined flange part 83 projects upward from the upper surface 84a of the lower gate frame 84. Thus, there is no need for the upper joined flange part 83 to extend in the vehicle front-rear direction, so that it is possible to minimize a thickness dimension, i.e. dimension in the vehicle front-rear direction, of the tailgate 15.

Further, the gate-side step 85 is fastened to an upper wall portion 84a of the lower gate frame 84 by means of a plurality of clips 87 that are spaced from one another in the vehicle width direction and mounted to an upper wall portion 88 of the gate-side step 85 via a seat portion 89. With the clips 87 engaged in mounting holes 91 formed in the upper wall portion 84a of the lower gate frame 84, the gate-side step 85 is fastened to the upper wall portion 84a.

Figure 9:
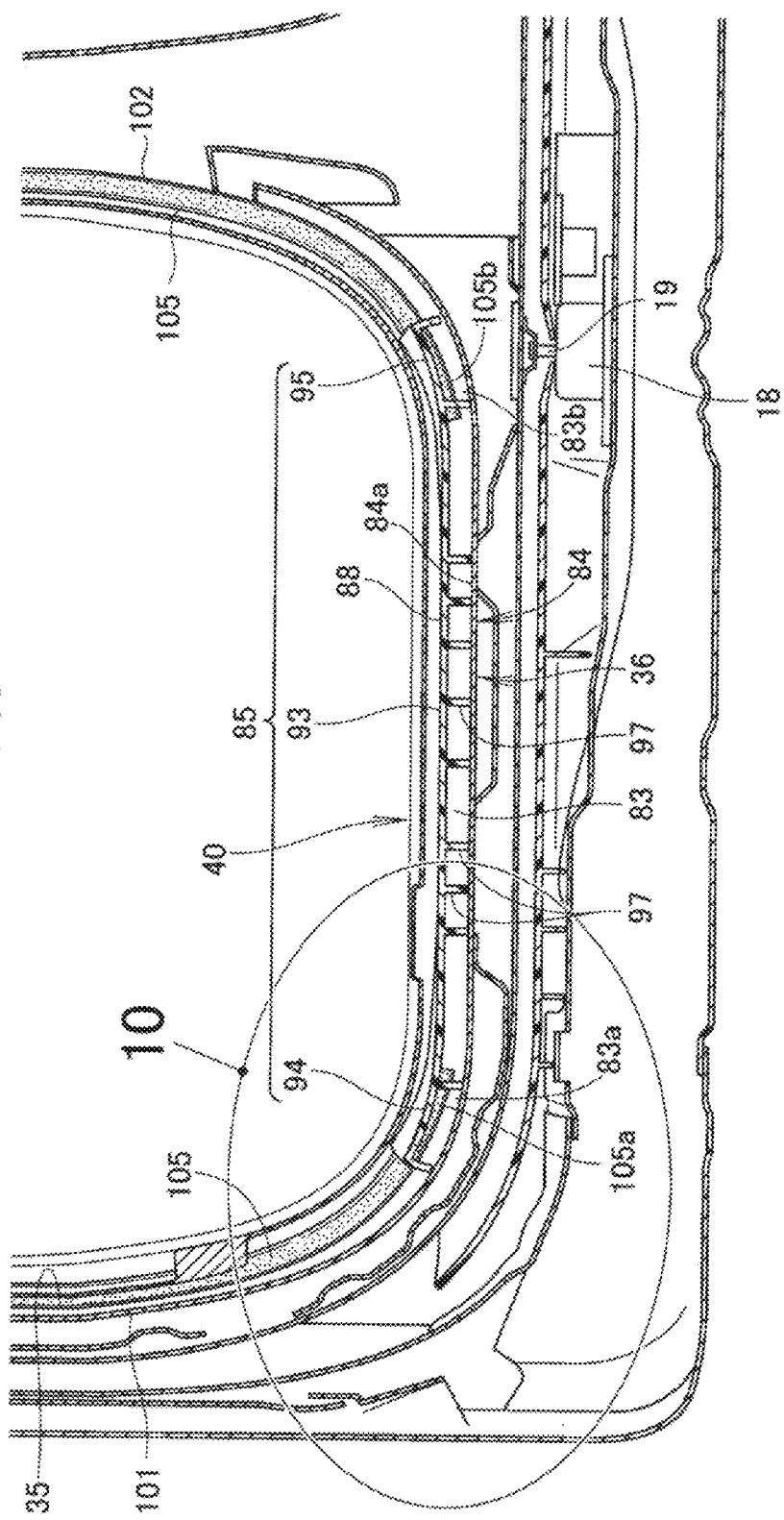
FIG. 9 is a sectional view taken along line 9-9 of FIG. 8.

Further, as shown in FIG. 9, the gate-side step 85 includes: a middle step portion 93 extending along the upper surface of the upper wall portion 84a of the lower gate frame 84; a left side corner portion 94 extending from the left end of the middle step portion 93 to a left side region of the upper wall portion 84a; and a right corner portion 95 extending from the right end of the middle step portion 93 to a right side region of the upper wall portion 84a. The middle step portion 93 constitutes a part of the lower edge portion 36 of the sub door opening section 35.

Referring back to FIGS. 6 and 8, with the gate-side step 85 provided on the upper wall portion 84a of the lower gate frame 84, the upper joined flange part 83 is covered from above with the gate-side step 85. The upper surface of the upper wall portion 88 of the gate-side step 85 constitutes the upper surface of the lower edge portion 36. The upper surface of the upper wall portion 88 of the gate-side step 85 (i.e., the upper surface of the lower edge portion 36) is located substantially flush with the upper surface of the front upper wall portion 62 of the step garnish 49 (i.e., the upper surface of the rear lower edge portion 16). Thus, when the sub door 40 is in the open position to open the sub door opening section 35, baggage can be loaded and unloaded smoothly through the sub door opening section 35. In particular, passengers can get in and out of the vehicle through the sub door opening section 35 smoothly without getting caught by a level difference between the rear lower edge portion and the door's lower edge portion.

Further, because the upper surface of the upper wall portion 88 of the lower edge portion 36 is located substantially flush with the upper surface of the front upper wall portion 62 of the rear lower edge portion 16, the upper surface of the front upper wall portion 62 of the rear lower edge portion 16 is kept at a suitable height position when the rear opening section 13 is opened with the tailgate 15 in the open position. Thus, baggage having been loaded into the vehicle interior 21 through the sub door opening section 35 can be retained in the vehicle interior 21 by the upper surface of the front upper wall portion 62 of the rear lower edge portion 16. Thus, the rear lower edge portion 16 can prevent the baggage, having been loaded in the vehicle interior 21, from undesirably getting out to the vehicle exterior as the tailgate 15 is opened.

Further, in the instant embodiment, the upper joined flange part 83 projects upward toward the upper wall portion 88 of the gate-side step 85. Thus, when a downward load F3 has been applied to the upper wall portion 88 of the door's lower edge portion 36 by baggage being placed on the upper wall portion 88 of the lower edge portion 36 or by a passenger stepping on the upper wall portion 88, the downward load F3 can be borne efficiently, because the upper joined flange part 83 extends in the same direction as the load F3.

Further, as shown in FIG. 7, a plurality of ribs 97 are provided on the gate-side step 85 and spaced from one another in the vehicle width direction. The ribs 97 project downward from the upper wall portion 88 of the lower edge portion 36 and extend in the thickness direction of the tailgate 15 (i.e., in the vehicle front-rear direction). Thus, the downward load F3 applied to the upper wall portion 88 of the gate-side step 85 (i.e., the upper surface of the lower edge portion 36 of the sub door opening section 35) can be borne more efficiently by the plurality of ribs 97. Each of the ribs 97 has a recessed portion 98 for receiving therein the upper joined flange part 83.

It is conceivable that, when a passenger gets in or out of the vehicle or baggage is loaded or unloaded, the lower edge portion 36 is displaced in the vehicle front-rear direction by a leg of the passenger or the baggage hitting the lower edge portion 36. Thus, in the instant embodiment, the ribs 97 each have the recessed portion 98 for receiving therein the upper joined flange part 83 as noted above, so that unwanted displacement, in the vehicle front-rear direction, of the gate-side step 85 can be prevented by the recessed portions 98 being abutted against the upper joined flange part 83.

Figure 10:
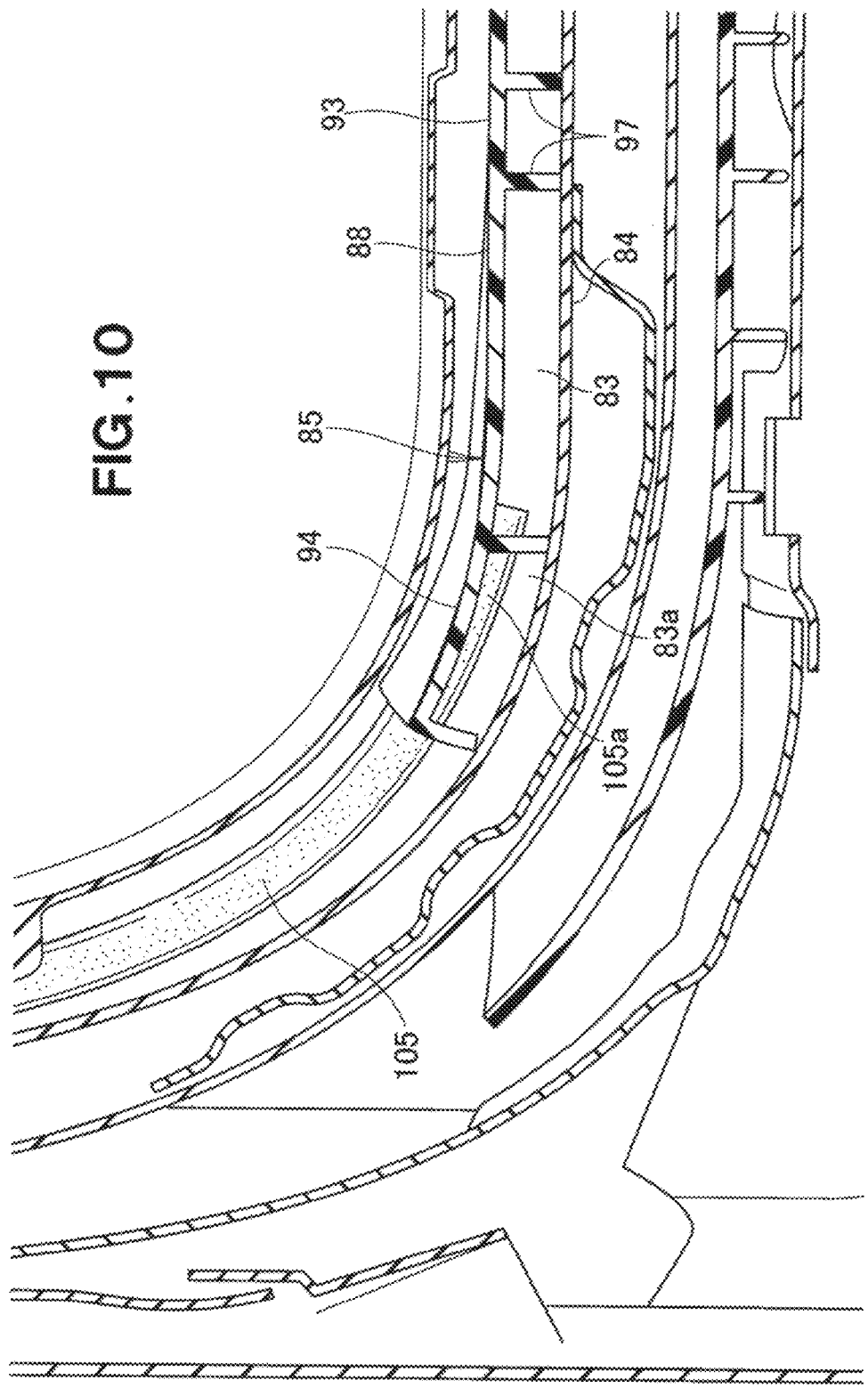
FIG. 10 is an enlarged fragmentary view of a section encircled at 10 in FIG. 9.

Further, as shown in FIGS. 9 and 10, a molding member 105 extends continuously along a left side edge portion 101, an upper edge portion (not shown) and a right side edge portion 102 of the sub door opening section 35. Further, a left lower end portion 105a of the molding member 105 is fitted in a left end portion 83a of the upper joined flange part 83, so that the molding member 105 is mounted at the left lower end portion 105a to the left end portion 83a (see also FIG. 8). Similarly, a right lower end portion 105b of the molding member 105 is fitted in a right end portion 83b of the upper joined flange part 83, so that the molding member 105 is mounted at the right lower end portion 105b to the right end portion 83b.

In such a condition, the left and right lower end portions 105a and 105b of the molding member 105 are covered from above with the left and right side corner portions 94 and 95, respectively, of the gate-side step 85. Thus, the left and right lower end portions 105a and 105b of the molding member 105 can be prevented from being exposed to the outside, so that an enhanced outer appearance of the vehicle can be achieved.

Further, the left lower end portion 105a of the molding member 105 extends to the left side corner portion 94, and the right lower end portion 105b of the molding member 105 extends to the right side corner portion 95. In other words, the molding member 105 is not mounted to the middle step portion 93 between the left corner portion 94 and the right side portion 95; that is, the molding member 105 is not mounted to the door's lower edge portion 36.

In this way, it is possible to lower the position of the upper wall portion 88 of the door's lower edge portion 36 by an amount corresponding to a thickness dimension of the molding member 105. Thus, a height of the upper wall portion 88 of the door's lower edge portion 36 can be determined without being influenced by the molding member 105, so that the upper surface of the upper wall portion 88 of the door's lower edge portion 36 can be readily disposed in substantially flush with the upper surface of the front upper wall portion 62 of the rear lower edge portion 16.

Figure 11:
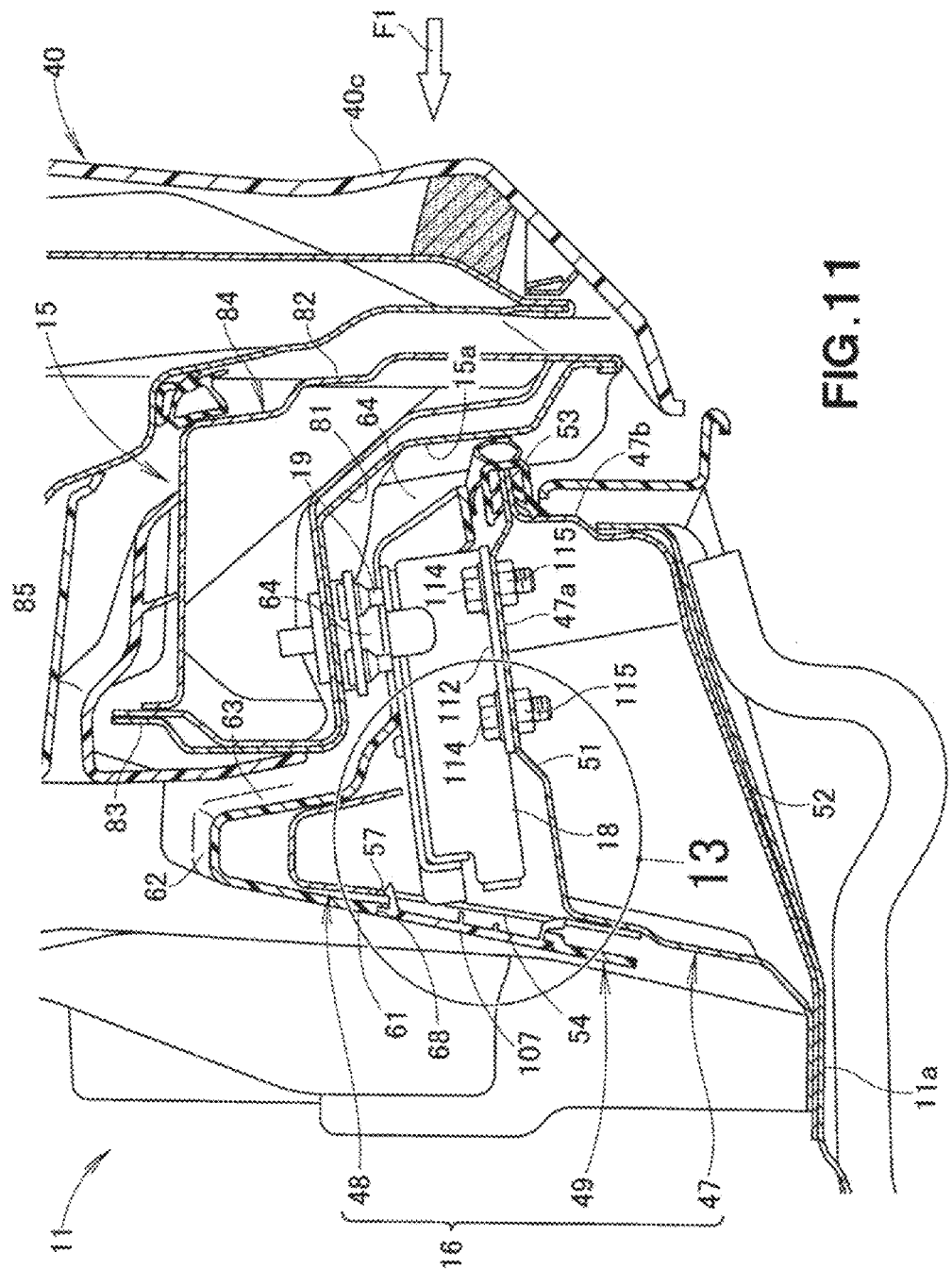
FIG. 11 is a sectional view taken along line 11-11 of FIG. 1.
Figure 12:
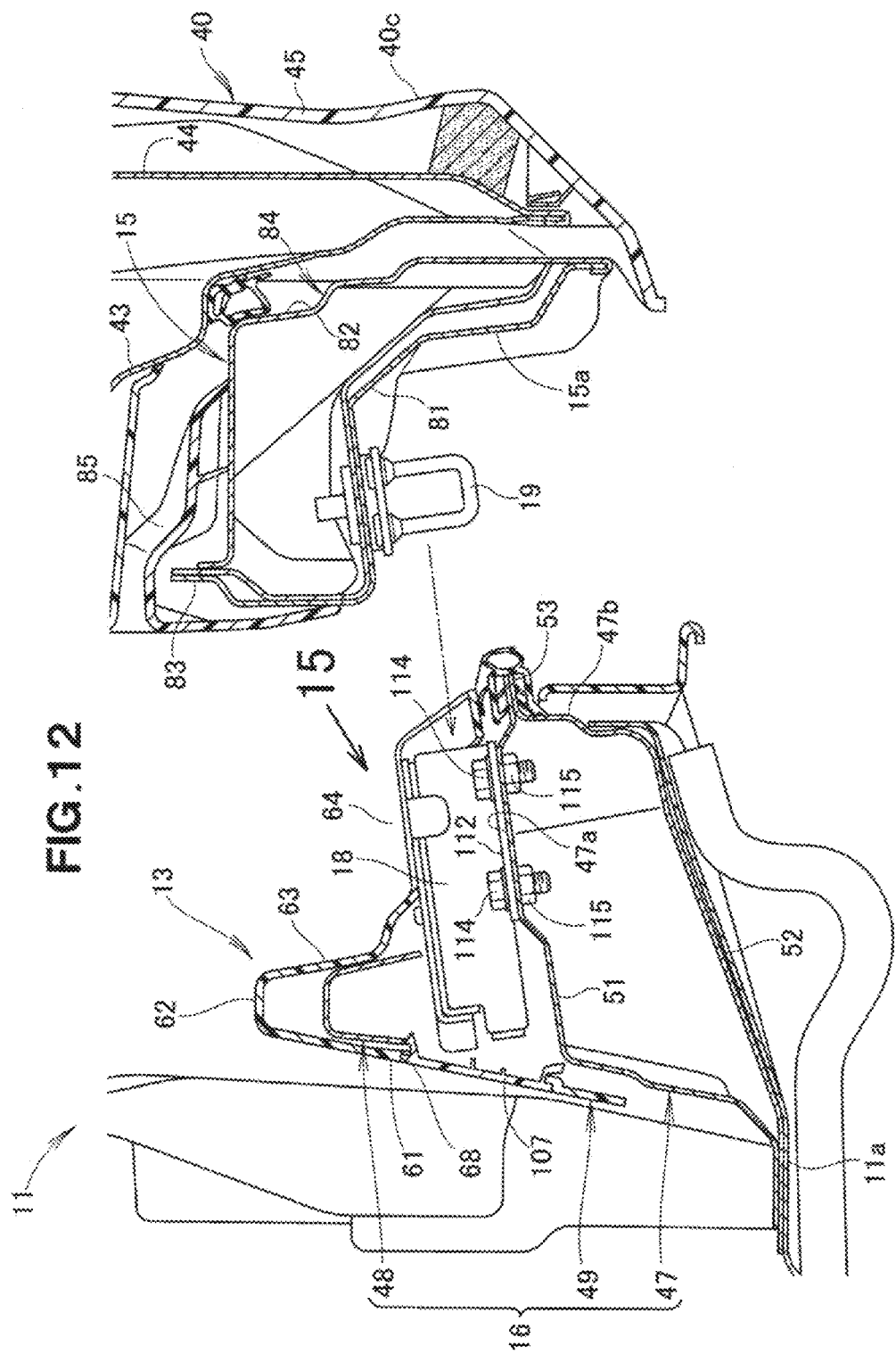
FIG. 12 is an exploded sectional view illustrating the tailgate-equipped vehicle body structure of FIG. 11 with the tailgate and the sub door detached therefrom.

Further, as shown in FIGS. 11 and 12, the latch device 18 is provided on the rear section 11a of the vehicle 11, while the striker 19 is provided on the tailgate 15. More specifically, the latch device 18 is mounted on the upper wall portion 47a of the rear lower frame 47 that is formed in a closed sectional shape and has of a high rigidity, and thus, the latch device 18 is supported firmly by the rear lower frame 47; that is, the latch device 18 can be mounted with an increased mounting rigidity.

Further, because the latch device 18 is mounted on the upper wall portion 47a of the rear lower frame 47, the striker 19 can be spaced upward from the rear lower frame 47 as the striker 19 of the tailgate 15 engages the latch device 18. Because the striker 19 can be prevented from interfering with the rear lower frame 47 in this manner, it is possible to enhance a degree of freedom in determining a mounted position of the striker 19 and hence mounted position of the latch device 18.

Further, the bracket 48 is provided above the latch device 18; in other words, the latch device 18 is provided beneath the bracket 48. Thus, it is possible to prevent a leg of a passenger or baggage from hitting the latch device 18 when the passenger gets in or out of the vehicle or baggage is loaded or unloaded to or from the vehicle.

Furthermore, the latch device 18 is covered from above with the vehicle-body-side step 49. Thus, the latch device 18 can be prevented from being exposed to the outside, so that an even further enhanced outer appearance of the vehicle can be achieved.

Figure 13:
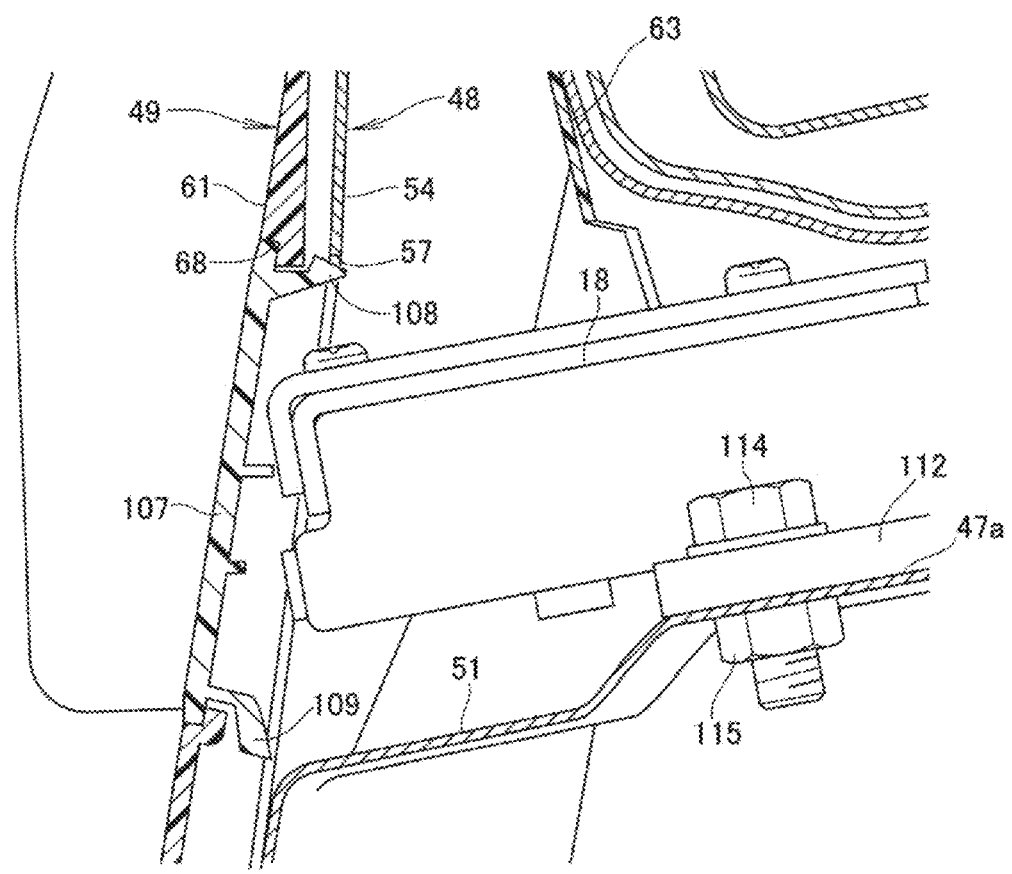
FIG. 13 is an enlarged fragmentary view of a section encircled at 13 in FIG. 11.
Figure 14:
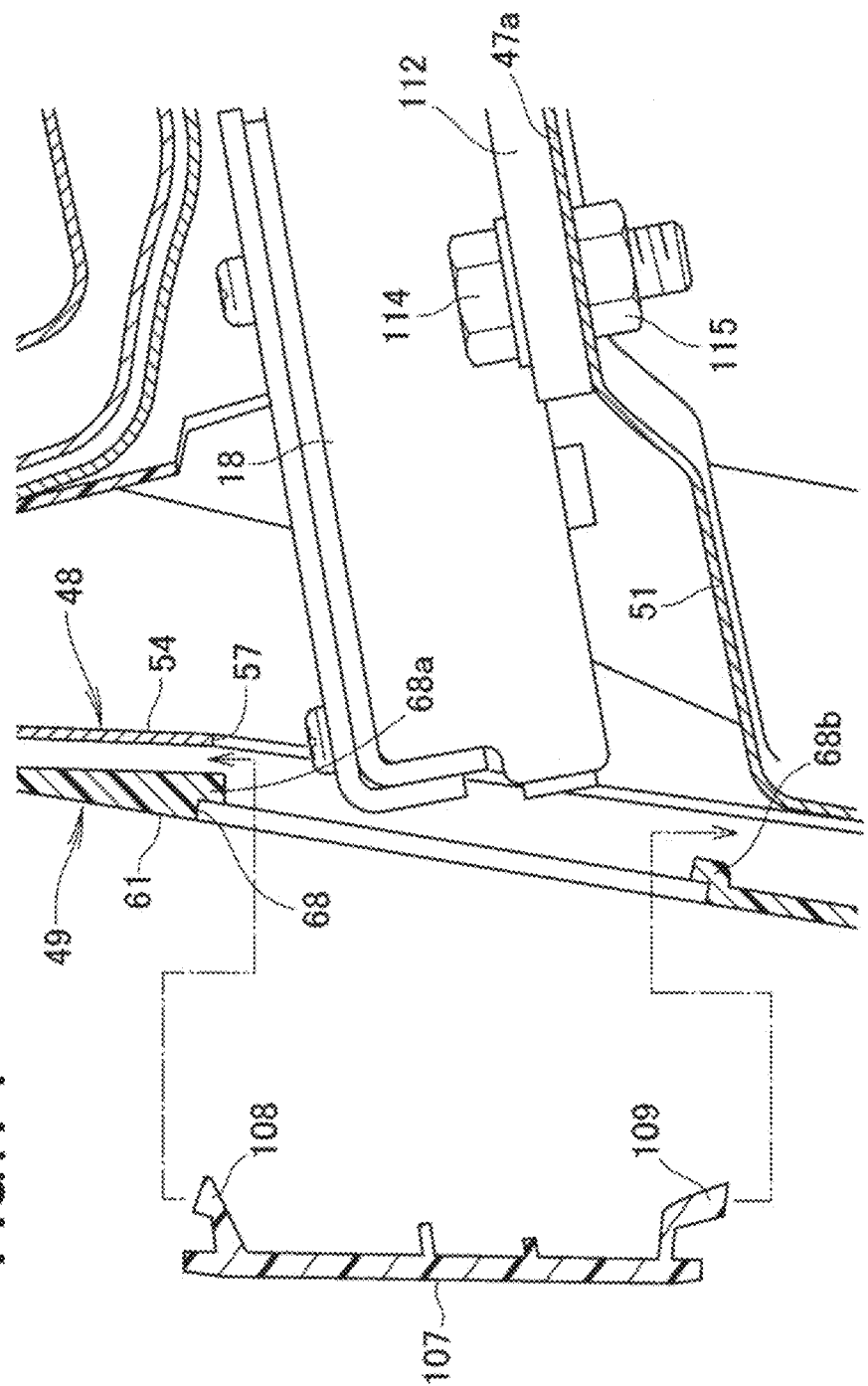
FIG. 14 is a sectional view showing the tailgate-equipped vehicle body structure of FIG. 13 with a cover detached therefrom.

Further, as shown in FIGS. 13 and 14, a maintenance opening 68 is formed in the front wall portion 61 of the vehicle-body-side step 49, and the maintenance opening 68 is opposed to the latch device 18 in the vehicle front-rear direction.

Furthermore, an opening 57 is formed in the front wall portion 54 of the bracket 48, overlaps the maintenance opening 68 in the vehicle front-rear direction and is opposed to the latch device 18 in the vehicle front-rear direction. The maintenance opening 68 and the opening 57 are provided for maintenance and inspection of the latch device 18.

The maintenance opening 68 is closed with a cover 107. More specifically, an upper engaging claw 108 of the cover 107 is engaged by an upper edge portion 68a of the maintenance opening 68, and a lower engaging claw 109 of the cover 107 is engaged by a lower edge portion 68b of the maintenance opening 68. Thus, the cover 107 is detachably attached to the maintenance opening 68 so that the maintenance opening 68 is openably closed with the cover 107.

Thus, when proper operation of the latch device 18 is difficult to secure due to failure of a battery etc., maintenance and inspection of the latch device 18 is permitted through the maintenance opening 68 after detachment of the cover 107 from the maintenance opening 68. When proper operation of the latch device 18 is difficult to secure due to failure of the battery, for example, the tailgate 15 can be opened mechanically by a human operator manually operating the latch device 18 through the maintenance opening 68 and the opening 57.

Whereas the instant embodiment has been described above with reference to FIGS. 13 and 14 in relation to the case where the cover 107 is detachably attached to the maintenance opening 68 of the resin-made vehicle-body-side step, the present invention is not so limited, and the cover 107 may be detachably attached to the metal bracket 48. In such a case, attaching the cover 107 to the high-rigidity bracket 48 can firmly support the cover 107 and hence increase a so-called mounting rigidity of the cover 107.

Referring back to FIGS. 11 and 12, the latch device 18 is provided forward, in the vehicle front-rear direction, of a rear end portion 47b of the rear lower frame 47, and the rear end portion 47b is provided forward of a lower portion 15a of the tailgate 15.

Thus, when the tailgate 15 has been deformed toward the front of the vehicle due to the forward load F1, the deformed tailgate 15 abuts against the rear end portion 47b of the rear lower frame 47. In this way, it is possible to prevent the deformed tailgate 15 from getting into abutting contact with the latch device 18 and interfering with the latch device 18.

Further, a lower portion 40c of the sub door 40 overlaps the latch device 18 as viewed from the rear of the vehicle. Thus, the forward load F1 can be absorbed by both the sub door 40 and the tailgate 15 rather than by the tailgate 15 alone, and it is possible to prevent the deformed tailgate 15 from abutting against the latch device 18 with an increased reliability.

Furthermore, the lower portion 40c of the sub door 40 is superimposed, from the rear of the vehicle, on the rear end portion 47b of the rear lower frame 47. Thus, when the sub door 40 has been deformed toward the front of the vehicle due to the forward load F1, the rear end portion 47b can prevent the deformed sub door 40 from getting into abutting contact with the latch device 18 and interfering with the latch device 18.

Further, as shown in FIG. 15, the latch device 18 has a striker insertion hole 111 for insertion therein of the striker 19 (see FIG. 11), and a pair of mounting portions 112 on opposite sides, in the vehicle width direction, of the striker insertion hole 111. The mounting portions 112 are fastened to an upper wall portion 47a of the rear lower frame 47 by means of a plurality of bolts 114 and a plurality of nuts 115.

Namely, opposite sides, in the vehicle width direction, of the striker insertion hole 111 (i.e., pair of mounting portions 112) of the latch device 18 are fastened to the upper wall portion 47a of the rear lower frame 47. Thus, when a load F4 has been applied to the latch device 18 from the striker 19 inserted in the striker insertion hole 111, the load F4 can be borne substantially uniformly by the bolts 114 and the nuts 115 provided on the opposite sides. In this way, it is possible to prevent the latch device 18 from inclining due to the load F4 applied from the striker 19 to the latch device 18, so that the striker 19 can be reliably engaged by a latch 113 of the latch device 18.

Referring back to FIG. 4, the storing recessed section 28 is provided forward of the rear lower edge portion 16, and the seats 24 are provided forward of the rear lower edge portion 16. Each of the seats 24 includes a seat cushion 25 and a seatback 26. The seat cushion 25 is provided on the floor of the vehicle in such a manner that it is slidable along the floor in the front-rear direction of the vehicle. The seatback 26 is mounted at its lower portion 26a on a rear portion 25a of the seat cushion 25 in such a manner that it is pivotable in the front-rear direction relative to the seat cushion 25.

The seatback 26 can be lapped onto the seat cushion 25 by being pivotally folded toward the front of the vehicle. By being pivotally folded like this, the back surface 26b of the seatback 26 (i.e., the upper surface of the seat 24) is placed in a substantially horizontal posture. Then, by sliding the seat 24 toward the rear of the vehicle in the aforementioned state, the seat 24 can be stored into the storing recessed section 28 in the folded configuration.

By the folded seat being stored into the storing recessed section 28, the back surface of the seatback 26 is placed substantially flush with the upper surface of the front upper wall portion 62 of the lower edge portion 16 (i.e., the front upper surface of the vehicle-body-side step 49) and the upper surface of the door's lower edge portion 36 (i.e., the upper surface of the gate-side step 85).

Thus, substantially flush (flat) surfaces are formed successively by the back surface 26b of the seatback 26, the upper surface of the front upper wall portion 62 of the lower edge portion 16 and the upper surface of the upper wall portion 88 of the door's lower edge portion 36. By providing such substantially flush surfaces, baggage can be loaded and unloaded smoothly through the sub door opening section 35 when the sub door opening 35 is in the open position; in particular, passengers can get in and out of the vehicle through the sub door opening section 35 smoothly without getting caught by the level difference.

Further, when the tailgate 15 is in the open position, a rear end portion 24a of the folded seat 24 (more specifically, the rear portion 25a of the seat cushion 25 and the lower portion 26a of the seatback 26) is covered with the rear lower edge portion 16. Thus, it is possible to prevent a passenger or baggage from hitting the rear end portion 24a of the folded seat 24 when the passenger gets in or out of the vehicle or baggage is loaded or unloaded to or from the vehicle.

It should be appreciated that the tailgate-equipped vehicle body structure of the present invention may be modified as necessary without being limited to the above-described embodiment. For example, whereas the embodiment has been described above in relation to the case where the sub door opening section 35 is used for loading/unloading of baggage or getting-in/out of a passenger with the sub door 40 held in the open position to open the sub door opening section 35, the present invention is not so limited, and the sub door opening section 35 may be constructed so as not to be used for getting-in/out of a passenger.

Further, the shapes and constructions of the vehicle body structure 10, the vehicle 11, the rear opening section 13, the tailgate 15, the rear lower edge portion 16, the seat 24, the sub door opening section 35, the door's lower edge portion 36, the sub door 40, the rear lower frame 47, the bracket 48, the vehicle-body-side step 49, the engaging claw 65, the clip 67, the support rib 74, the inner gate panel 82, the outer gate panel 83, the gate-side step 85, the rib 97, the recessed portion 98, the molding member 105, etc. are not limited to those shown and described above and may be modified as appropriate.

The basic principles of the vehicle body structure of the present invention are well suited for application to automobile vehicles which include a tailgate for opening and closing a rear opening section of the vehicle and a sub door provided on the tailgate for opening and closing a sub door opening section provided in the tailgate.

What is claimed is:

1. A tailgate-equipped vehicle body structure comprising:
a tailgate for opening and closing a rear opening section provided in a rear section of a vehicle; and
a sub door provided on the tailgate for opening and closing a sub door opening section provided in the tailgate,
an upper surface of a lower edge portion of the rear opening section and an upper surface of a lower edge portion of the sub door opening section being located in substantially flush with each other,
wherein the tailgate includes an inner panel disposed adjacent to a vehicle interior and an outer panel disposed adjacent to a vehicle exterior and having a closed sectional shape defined with respective flanges of the inner and outer panels joined to each other, the respective flanges of the inner and outer panels joined to each other constituting a joined flange part projecting in an up-down direction of the vehicle in the lower edge portion of the sub door opening section, and
wherein the tailgate further includes a gate-side step covering the joined flange part from above, and
an upper surface of an upper wall portion of the gate-side step constituting the upper surface of the lower edge portion of the sub door opening section.

2. The tailgate-equipped vehicle body structure according to claim 1, wherein the gate-side step includes a rib projecting downward from the upper wall portion of the gate-side step and extending in a thickness direction of the tailgate, and
the rib has a recessed portion formed to receive therein the joined flange part.

3. The tailgate-equipped vehicle body structure according to claim 1, which further comprises a molding member extending along the joined flange part of the tailgate and mounted at opposite end portions thereof to the joined flange part, and
wherein the gate-side step includes a middle step portion constituting a part of the lower edge portion of the sub door opening section, and corner portions provided at opposite ends of the middle step portion, and
the opposite end portions of the molding member are covered with respective ones of the corner portions.

4. A tailgate-equipped vehicle body structure comprising:
a tailgate for opening and closing a rear opening section provided in a rear section of a vehicle; and
a sub door provided on the tailgate for opening and closing a sub door opening section provided in the tailgate,
an upper surface of a lower edge portion of the rear opening section and an upper surface of a lower edge portion of the sub door opening section being located in substantially flush with each other,
wherein the rear opening section includes a closed-sectional portion formed of a metal panel in a closed sectional shape, at least a part of a lower portion of the tailgate being located above an upper surface of the closed-sectional portion, and which further comprises a vehicle-body-side step disposed above the closed-sectional portion, an upper surface of the vehicle-body-side step constituting the upper surface of the lower edge portion of the rear opening section.

5. The tailgate-equipped vehicle body structure according to claim 4, which further comprises a bracket provided, as a separate member, on the upper surface of the closed-sectional portion, and
wherein the bracket is located within the vehicle-body-side step and opposed to a front surface of the lower portion of the tailgate.

6. The tailgate-equipped vehicle body structure according to claim 5, which further comprises a support rib projecting from the upper wall portion of the vehicle-body-side step toward an upper surface of the bracket.

7. The tailgate-equipped vehicle body structure according to claim 6, which further comprises an engaging claw provided on a front wall portion of the vehicle-body-side step for engaging the bracket, and wherein a mounting portion for mounting to the upper surface of the closed-sectional portion is provided on a rear portion of the vehicle-body-side step.

8. A tailgate-equipped vehicle body structure comprising:

a tailgate for opening and closing a rear opening section provided in a rear section of a vehicle; and a sub door provided on the tailgate for opening and closing a sub door opening section provided in the tailgate, an upper surface of a lower edge portion of the rear opening section and an upper surface of a lower edge portion of the sub door opening section being located in substantially flush with each other, wherein a storing recessed section for storing a seat of the vehicle in a folded configuration is provided forward, in a vehicle front-rear direction, of the lower edge portion of the rear opening section, and an upper surface of the seat stored in the storing recessed section is located in substantially flush with the upper surface of the lower edge portion of the rear opening section and the upper surface of the lower edge portion of the sub door opening section.

* * * * *